United States Patent [19]
Figueras

[11] Patent Number: 5,240,137
[45] Date of Patent: Aug. 31, 1993

[54] METHOD OF MANUFACTURING A COOKING UTENSIL

[75] Inventor: Jaime M. Figueras, Barcelona, Spain

[73] Assignee: AMC International Alfa Metalcraft Corporation AG, Rotkreuz, Switzerland

[21] Appl. No.: 922,330

[22] Filed: Jul. 30, 1992

[30] Foreign Application Priority Data

Jul. 30, 1991 [DE] Fed. Rep. of Germany ....... 4125114

[51] Int. Cl.5 ............................................. A47J 36/02
[52] U.S. Cl. .................................... 220/626; 220/912; 126/390; 228/24
[58] Field of Search ............... 220/453, 912, 603, 626, 220/27, 173.2, 175, 193, 212, 243; 126/390

[56] References Cited

U.S. PATENT DOCUMENTS

| | | | |
|---|---|---|---|
| 2,217,555 | 10/1940 | Klusmeyer | 126/390 |
| 4,029,253 | 6/1977 | Cartossi | 220/626 X |
| 4,204,607 | 5/1980 | Zani | 220/626 |
| 4,363,316 | 12/1982 | Aakenus et al. | 126/390 |
| 4,552,284 | 11/1985 | Rummelsburg | 220/453 |
| 4,596,236 | 6/1986 | Eide | 220/626 X |
| 5,154,311 | 10/1992 | Cartossi | 126/390 X |

*Primary Examiner*—Steven M. Pollard
*Attorney, Agent, or Firm*—Herbert Dubno

[57] ABSTRACT

A method of manufacturing a cooking utensil comprising a round container for the food, the container comprising a base, a plate of heat-conducting material and a cap enclosing the plate. A plate is inserted into the enclosing cap and leaves an annular flow space between it and a preformed collar on the cap. The assembly of the container base, the plate and the cap is centered between the ram and die of a press and intermetallically bonded by single or multiple impulse pressure, so as to form the convex curvature of the cap bottom and to mold the rim of the cap collar around the vessel. During impulse pressure, the plate is pressed by plastic deformation into the flow space, where it is intermetallically bonded to the cap bottom, the cap collar and the corresponding region of the container. Use is made of a plate having a base member which is circular in plan view and has at least three centering projections on its rim, around its circular periphery. The impulse pressure is guided so that the intermetallic bond is formed at the same time as the material of the plate base member and the material of the centering projections is flow-bonded, and during the subsequent plastic deformation, the plate material forms a uniform collar which is pressed into the rim region of the cap collar.

10 Claims, 2 Drawing Sheets

METHOD OF MANUFACTURING A COOKING UTENSIL

CROSS REFERENCE TO RELATED APPLICATION

This application is related to the concurrently filed commonly assigned copending application Ser. No. 07/869,925 corresponding to German application P 41 25 115.6 filed Jul. 30, 1992.

FIELD OF THE INVENTION

The invention relates to a method of manufacturing a cooking utensil and, more particularly, to a pressure-pulse method of fabricating the utensil.

BACKGROUND OF THE INVENTION

A cooking utensil can comprise a round container for holding the food, the container having a base, a plate made of heat-conducting material and a cap enclosing the plate, the base of the enclosing cap being given a convex curvature towards the container and the cap having a collar which abuts the container in a curved transition region between the container base and the container jacket.

The container and the cap can be made of stainless steel and the plate can be intermetallically bonded to the container base and the cap.

In order to produce the intermetallic bond a plate can be inserted into the cap so as to leave an annular flow space between it and the preformed cap collar.

The assembly comprising the container base, the plate and the cap can be centered between the punch and the die of a press and intermetallically bonded by single or multiple impulse pressure so as to form the curvex curvature of the cap bottom and to mold the rim of the cap around the container. During the pulse pressure the plate is pressed by plastic deformation into the flow space, where it is intermetallically bonded to the cap base, the cap collar and the corresponding region of the container.

Of course the method can be carried out at ambient temperature or with heating.

The pulse energy will be adjusted to the temperature of the container, at least in the base region, the cap and the plate. Usually these temperatures are chosen so as to be near but sufficiently below the melting point of the plate material.

Aluminum in the form of industrially pure aluminum is a very useful plate material. Copper is also a useful plate material.

The cooking utensils can be pots, pans or the like, more particularly cooking pots and pressure cookers.

The plate improves the heat transfer from a hotplate or stove plate to the food. The heat transfer is adversely affected if the intermetallic bond is damaged. This applies even if the damage occurs in the region of the cap collar.

Of course, the tools, i.e. the die and the ram, for applying pulse pressure in a press, must be adjusted so as to obtain the aforementioned slightly convex shaping of the cap bottom. Usually the container base is made slightly convex outwardly. The geometrical conditions with regard to the container base, the cap and the plate must be adjusted so that in the finished cooking utensil, the plate completely fills the space between the container base and the cap, i.e. enters and fills the flow space when the intermetallic bond is manufactured.

A defined, undisturbed flow of plate material is important for the intermetallic bond. The plate can be a flat plate or can have a lenticular or stepped cross-section. Optionally according to the invention, the surface of the cap and the container base facing the plate are modified so as to assist the intermetallic bonding, e.g. by etching, roughening or the like.

It is particularly important also that the rim of the cap collar should faultlessly abut the container. if plate material flows out here, the container will have to be rejected for aesthetic reasons and to avoid corrosion.

If there is a gap, water can enter during use or washing and can cause trouble through corrosion.

In the known method, on which the invention is based (EP 0 209 745), the operation is as follows: the plate is secured in the center of the cap surface by spot welding. The assembly comprising the cap, plate and container base or container is heated to a temperature which is near but below the melting point of the plate material. The initial thickness of the plate is at least 20% greater than the final thickness of the plate after the intermetallic bond has been formed.

In a first phase of pulse pressure, the pressure is applied progressively from the center to the edge of the assembly so as to obtain a special convexity, i.e. so that the total curvature of the convexity of the shaped plate and of the container is not less than 0.5% of the average diameter of the container base in its final shape.

This method drives air from the center outwards from the assembly comprising the container base, plate and cap.

The known method, however, results in constraints which restrict the usefulness of the previously-described steps. This is because of certain conditions: on the one hand the initial thickness of the plate must be at least 20% greater than the final thickness thereof after manufacture of the intermetallic bond, and on the other hand the convexity must be adjusted as previously described.

Also, it is not possible under all conditions to ensure that the spot-welded connection between the plate and the base of the cap is resistant to pulse pressure. If it tears during application of the pulse pressure, displacements during the pressure pulse cannot be avoided, and consequently it is impossible to ensure that the plate is given an intermetallic bond which meets all requirements even in the edge region and the cap collar.

OBJECT OF THE INVENTION

The object of the invention is to provide a process for producing a cooking utensil having the construction described above, so as to ensure that the plate is intermetallically bonded and will meet all requirements even in the edge region and the cap collar, and that there are no faults at the rim of the cap collar.

SUMMARY OF THE INVENTION

To this end, according to the invention, use is made of a plate comprising a base member which is circular in a plan view and has at least three centering projections at the edge around its circular periphery. The plate is centered in the cap so as to be resistant to pulse pressure, by the centering projections abutting the cap collar and/or abutting of an intermediate region between the cap bottom and the cap collar. The pulse pressure is provided so that during the formation of the intermetallic bond, the material of the plate base member and the material of the centering projections are flow-bonded and during the subsequent plastic deformation the plate material forms a uniform collar which is pressed into the rim region of the cap collar.

In addition for technical reasons, central spot welding, for the purpose of fixing only, can be carried out in conjunction with loading the press for carrying out the method.

In a preferred embodiment of the invention, use is made of a plate having centering projections uniformly distributed over its periphery. The invention is based on the discovery that faults in the intermetallic bond interfering with heat transfer, such as gaps between the rim of the collar and the container, can be avoided if the plate, prefabricated with low tolerances, is centered, by means of the aforementioned centering projections in the plate, with respect to the cap collar, preformed with high accuracy, during the impulse pressure.

There might be doubts per se in using centering projections in the manner described, because in the region of the centering projections there might be a disturbance in the plastic deformation, which should proceed uniformly from the center of the plate outwards, as is essential for an adequate intermetallic bond. This surprisingly is not the case, since the pressure pulse can be so guided as regards energy, i.e. impingement, that during the formation of the intermetallic bond the material of the plate base member and the material of the centering projections is bonded by flowing and, during the subsequent plastic deformation, the plate material forms a uniform rim which is practically free from non-uniformity over its periphery and can be pressed into the rim region of the cap collar.

It could not be expected that the material of the plate base member and the material of the centering projections could be combined by flowing together. This results, however, is attainable, even though a certain texture is still observable in a polished section of the widened centering projections, though this does not affect the formation of the intermetallic bond. The centering, and the resulting support of the plate on the cap collar during pulse pressure and plastic deformation, are so accurate that no troublesome gap forms and no plate material escapes between the rim of the cap and the container. Of course the receiving pot and the cap and plate must be sufficiently accurately positioned and centered in the tools of the press used for impulse pressure. Of course also, the volume of the plate must be sufficiently accurately adjusted to the space inside the cap, and the flow space must be adjusted to ensure adequate plastic deformation resulting in an intermetallic bond which meets all requirements.

According to the invention, there are a number of possibilities of further developing the method according to the invention. Preferably use is made of a plate having centering projections which extend in the radial direction and in the peripheral direction for a few millimeters and have a preferably circular curve towards the cap collar or to the transition region between the cap collar and the cap base. —"Some millimeters" according to the invention means 5 to 10 millimeters. The arcuate shape of the centering projections results in spot or line contact at the beginning of contact between the plate and the cap, thus assisting the flow-joining of the material of the plate base member and of the centering projections, and the intermetallic bond extending to the region of the cap collar.

Surprisingly in carrying out the method according to the invention, it is not necessary to take account of the constraints initially described in connection with the method on which the invention is based (EP 0 209 745). Instead, use can be made of a plate having a thickness which, in the cold state before plastic deformation, is not more than 16% greater than after plastic deformation. This reduces the amount of material required for producing the cooking utensil and also results in particularly advantageous flow conditions for the intermetallic bond when the method according to the invention is followed.

The invention ensures, as if by a seal, that no plate material can escape over the rim of the cap collar, in that during impulse pressure and the resulting plastic deformation, the rim of the cap collar or an edge on the rim of the cap collar is pressed in sealing-tight manner against the container, resulting in permanent deformation of the container and/or of the cap collar. At the same time the last mentioned step improves the intermetallic joint in the region of the rim of the cap collar.

In the finished cooking utensil, the gap between the cap and the container at the edge of the collar is so narrow as to prevent the entry of water, even when released from pressure by washing agents. No trouble from corrosion has been observed in the enclosed region.

According to the invention, "pressed in sealing-tight manner" means sealed tightly with regard to the plastically deformed "flowing" metal, but sufficiently permeable to air.

Of course, care must be taken to prevent air inclusions from interrupting the intermetallic bond and adversely effecting heat transfer, in that during impulse pressure the air is first pressed out of the region between the container base and the cap, after which the rim of the cap collar or an edge on the rim of the cap collar is pressed in sealing-tight manner against the container.

With regard to the choice and dimensions of the material, there are a number of possibilities according to the invention. For example, a wide range of stainless steels can be used for the container and the cap. With regard to dimensions, a preferred embodiment of the invention has a cap made of sheet metal about equal in thickness to the sheet metal forming the container. The thickness of the sheet-metal cap should not be more than 20% less than the thickness of the metal in the container. This avoids bimetallic-like deformation and/or stresses between these components and the plate during use. As already mentioned, plates made of industrially pure aluminum can be used.

Although the method according to the invention can be used when cold, i.e. at ambient temperature, a preferred embodiment of the invention is characterized in that the impulse pressure is exerted on the container, the cap and the plate at a temperature which is near but slightly below the melting-point of the plate, and the shaping tools are used at a temperature in the range of 100° C. to 350° C., e.g. 100° C. to 150° C. for the die and 200° C. to 350° C. for the ram.

The invention also relates to cooking utensils of the initially-described kind, manufactured by the method according to the invention.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
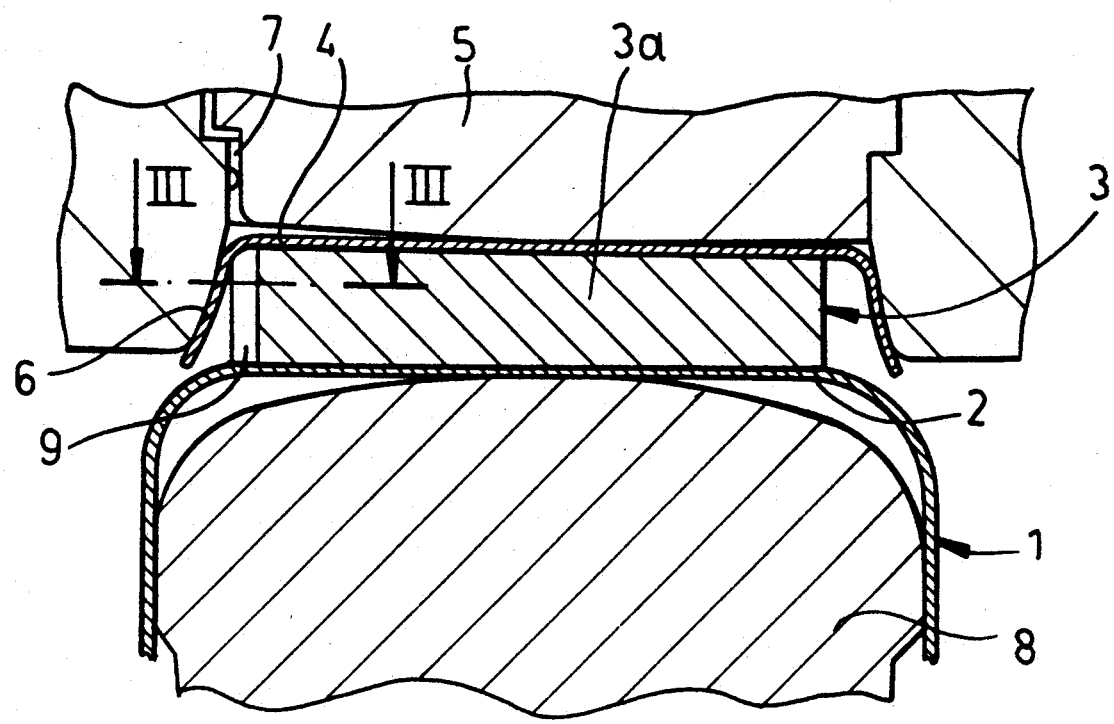
FIG. 1 is a cross sectional view which shows parts of a tool, comprising a die and ram, for the container of the cooking vessel, the cap and the plate during a step in the process according to the invention.

A cooking utensil can comprise a container 1, a container base 2, a plate 3 of easily sliding material and a cap 4 on plate 3.

FIGS. 1 to 4 show the cooking vessel with the container 2 and the cap 4 on the base. The container 1 and cap 4 are made of stainless steel. Plate 3 can be made of an aluminum alloy. It is intermetallically bonded to the container base 2 and the cap 4 by the method according to the invention. The details thereof have already been described.

Figures 2, 3:
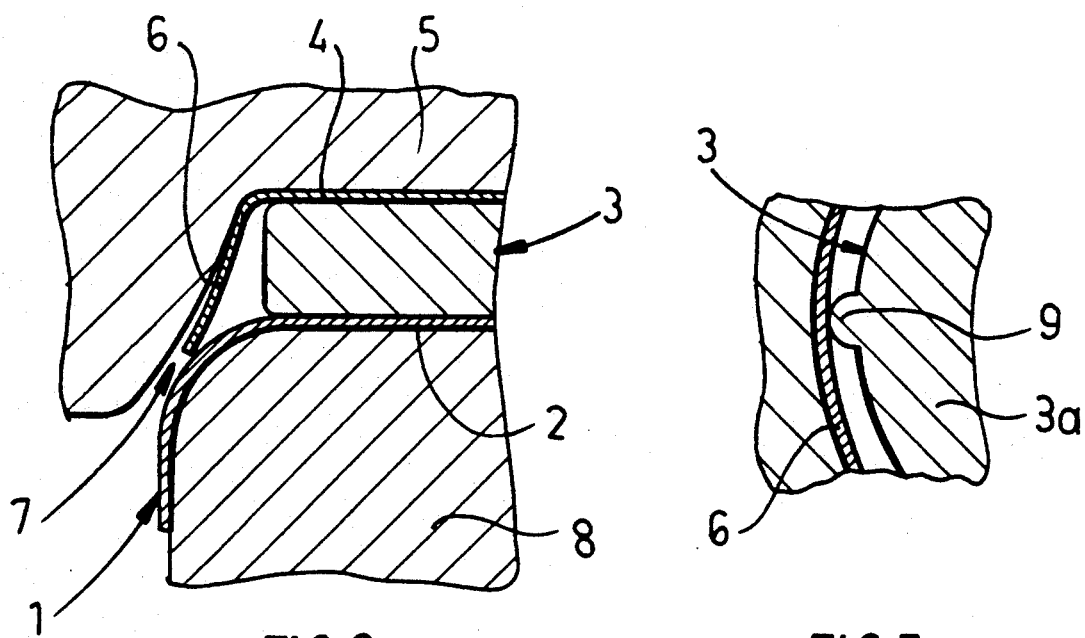
FIG. 2 shows another embodiment of the article in FIG. 1.
FIG. 3 is a section along lines III—III of FIG. 1.

As shown in FIGS. 1 and 2, in the embodiment use is made of a die 5 which in the region of the cap collar 6 has a vent structure 7 whereby air during application of pulse pressure can be discharged from the assembly comprising the container base 2, the plate 3 and the cap 4.

As the drawing also shows, the die 5 and/or ram 8 and/or cap 4 in the region of the cap collar 6 are designed so that during application of pulse pressure, air is expelled before the collar 6 is placed against the container 1 or the transition region between the container 1 and the container base 2.

In the embodiment in FIG. 1, use is made of a die having vent structures 7 in the form of bores in the transition region between the cap 4 and the collar 6. By contrast in the embodiment in FIG. 2, use is made of a die 5 which has an annular venting gap 7 in the region between the die structure and the collar 6 before being shaped. Towards the rim of the collar, the annular gap 7 widens in a wedge, as seen in cross-section. Consequently during application of pulse pressure, the ram 8 is pressed against the containers 1 and abuts the container 1 when the cooking utensil is finished.

As a comparison between FIGS. 1 and 3 shows, the plate 3 is statically determined and centered on the cap 4 without clearance, owing to the centering projections 9 formed on the rim of plate 3. In this manner, plate 3 is disposed in cap 4 so as to be resistant to pulse pressure. Accordingly, plate 3 consists of a base member 3a and the centering projections 9.

Figure 4:
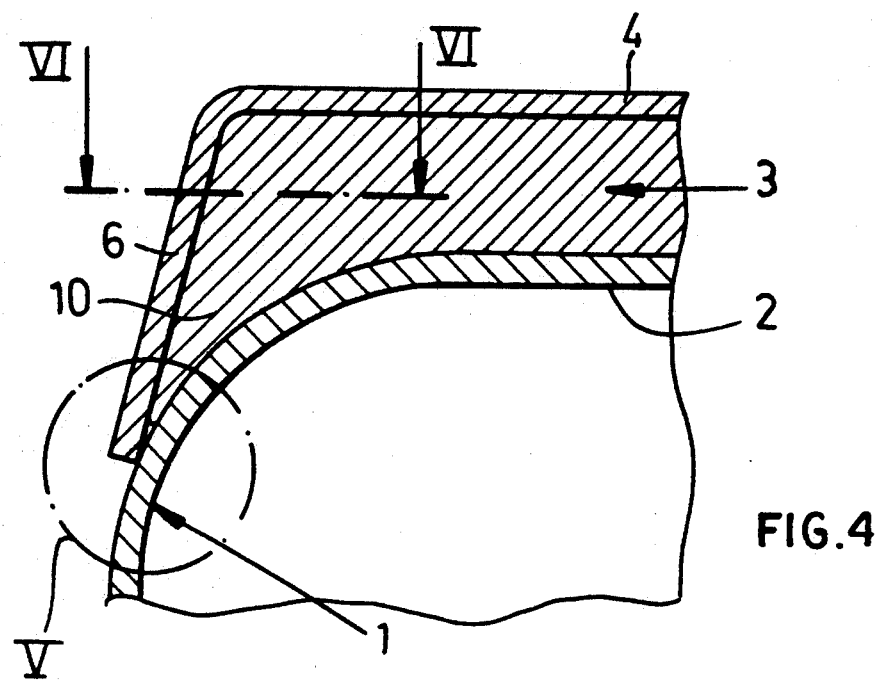
FIG. 4 is a partial vertical section through a cooking utensil produced by the method according to the invention, in the region of the cap.
Figure 6:
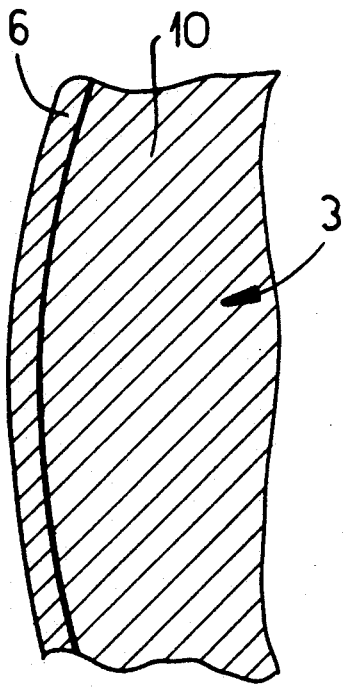
FIG. 6 is a section taken along line VI—VI of FIG. 4.
Figure 5A:
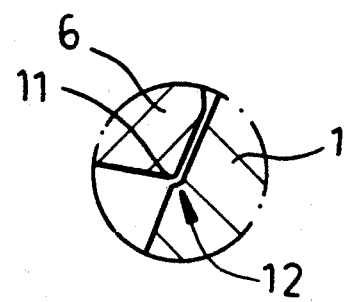
FIG. 5A is a detail view of the region VA of FIG. 5.

As a comparison between FIGS. 4 and 6 shows, the pulse pressure is guided so that during the formation of the intermetallic bond, the material of the plate base member 3a and the material of the centering projections 9 flow together and join and, during subsequent plastic deformation, the plate material forms a uniform rim 10 having a very uniform cross-section round its entire periphery, and is pressed into the rim region of the cap collar 6.

"Flow joining" means that the plate material no longer shows any parting gaps or the like, even though a certain texture is recognizable from a polished section in the region or a preformed centering projection 9 in the finished cooking utensil.

Figure 5:
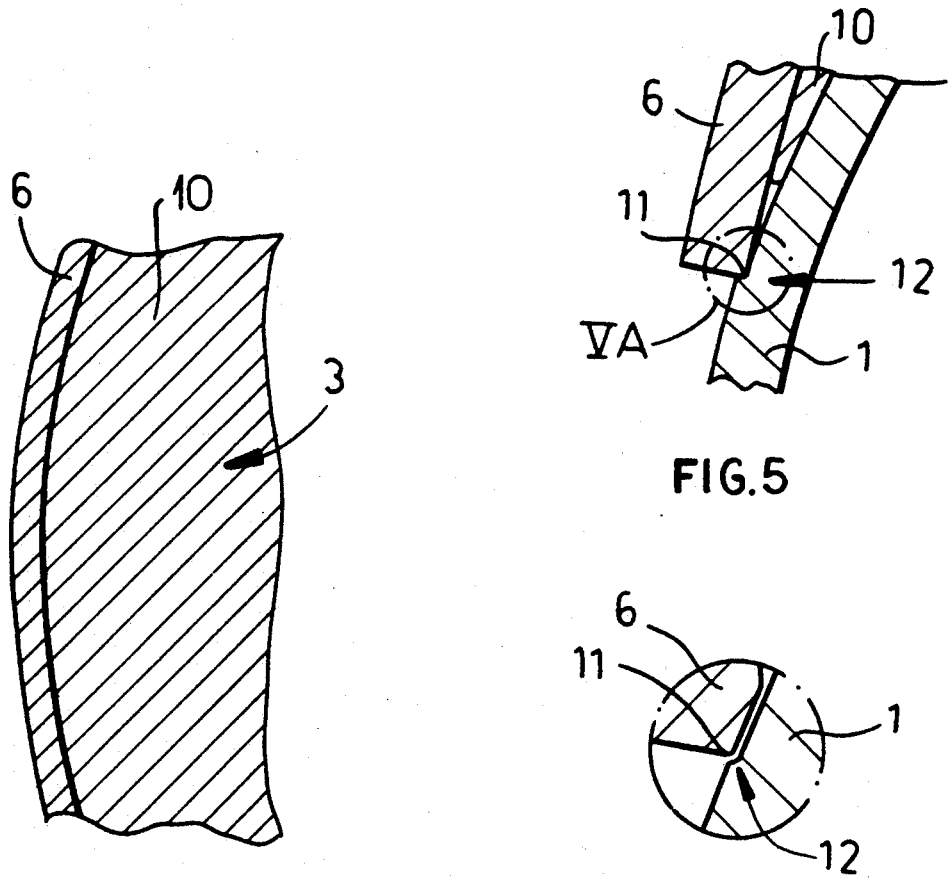
FIG. 5 is a larger-scale detail view of the portion V of the article in FIG. 4.

The pulse pressure is guided so that, during application of one or more pressure pulse and the resulting plastic deformation, an edge 11 on the rim of the collar 6 is formed in sealing-tight manner on container 1, resulting in permanent deformation 12 of the container 1 and collar 6, as can be seen from FIG. 5 and the magnified portion of FIG. 5. "Pressed in sealing-tight manner" means sealed-tight with regard to the plastically deformed "flowing" plate material, but so that air can adequately escape as previously described.

I claim:

1. In a process for manufacturing a cooking utensil comprising a round container for holding material to be cooked, the container have a base, a plate made of heat-conducting material and a cap enclosing the plate, the base of the enclosing cap being given a convex curvature towards the container and the cap having a collar which abuts the container in a curved transition region region between the container base and the container jacket, the container and the cap being made of stainless steel and the plate being intermetallically bonded to the container base and the cap, the plate being inserted into the cap so as to leave an annular flow space between it and the preformed cap collar, and the assembly comprising the container base, the plate and the cap being centered between a ram and the die of a press and is intermetallically bonded by single or multiple pressure pulse so as to form a convex curvature of the cap bottom and to mold a rim of the cap collar around the container, during the pressure pulse the plate being pressed by plastic deformation into the flow space, where it is intermetallically bonded to the cap base, the cap collar and a corresponding region of the container, the improvement wherein:

said plate comprises a base member which is circular in plan view and has at least three centering projections at the edge around its circular periphery;

the plate is centered in the cap so as to be resistant to pressure pulses, by the centering projections abutting the cap collar or abutting an intermediate region between the cap bottom and the cap collar, and the pressure pulse is provided so that during the formation of the intermetallic bond, the material of the plate base member and the material of the centering projections are flow-bonded and during the subsequent plastic deformation the plate material forms a uniform collar which is pressed into the rim region of the cap collar.

2. The improvement according to claim 1 wherein said plate has centering elements uniformly distributed over its periphery.

3. The improvement according to claim 1 wherein the plate has centering projections which extend in a radial direction and in a peripheral direction for a few millimeters and have a circular curve towards the cap collar or towards the transition region between the cap collar and the cap base.

4. The improvement according to claim 1 wherein the plate has a thickness which, in a cold state before plastic deformation, is not more than 16% greater than after plastic deformation.

5. The improvement according to claim 1 wherein during the pressure pulse and the resulting plastic deformation, the rim of the cap collar or an edge on the rim of the cap collar is pressed in sealing-tight manner against the container, resulting in permanent deformation of the container or of the cap collar.

6. The improvement according to claim 1 wherein during the pressure pulse the air is first pressed out of the region between the container base and the cap, after which the rim of the cap collar or an edge on the rim of the cap collar is pressed in sealing-tight manner against the container.

7. The improvement according to claim 1 wherein the cap is made of sheet metal about equal to thickness to sheet metal forming the container.

8. The improvement according to claim 1 wherein the cap is made of sheet metal which is not more than 20% thinner than sheet metal forming the container.

9. The improvement according to claim 1 wherein said plate is made of industrially pure aluminum.

10. The improvement according to claim 1 wherein the pressure pulse is exerted on the container, the cap and the plate at temperature in the region of the melting-point of the plate, and the impulse pressure tools are used at a temperature in the range between 100° C. and 350° C.

* * * * *